(12) United States Patent  
Moore

(10) Patent No.: US 6,587,082 B1  
(45) Date of Patent: Jul. 1, 2003

(54) MULTIPLE ACCESS COMPUTER MONITORING SYSTEM

(76) Inventor: Stacey Y. Moore, 13811 Glenoaks Blvd., #116, Sylmar, CA (US) 91342

( * ) Notice: Subject to any disclaimer, the term of this patent is extended or adjusted under 35 U.S.C. 154(b) by 0 days.

(21) Appl. No.: 09/424,687

(22) PCT Filed: Jun. 9, 1998

(86) PCT No.: PCT/US98/12012

§ 371 (c)(1),
(2), (4) Date: Nov. 30, 1999

(87) PCT Pub. No.: WO98/57319

PCT Pub. Date: Dec. 17, 1998

Related U.S. Application Data

(60) Provisional application No. 60/049,114, filed on Jun. 10, 1997.

(51) Int. Cl.[7] ............................................... G09G 5/00
(52) U.S. Cl. ..................... 345/1.3; 345/903; 361/681; 248/917
(58) Field of Search ................................... 345/1–3, 204, 345/698, 903, 1.1–3.4; 248/917–923; 361/681, 682

(56) References Cited

U.S. PATENT DOCUMENTS

| | | | | | |
|---|---|---|---|---|---|
| 2,547,447 A | * | 4/1951 | De Boer | ..................... | 181/145 |
| 4,204,206 A | * | 5/1980 | Bakula et al. | ............... | 345/635 |
| 4,414,621 A | * | 11/1983 | Bown et al. | ................. | 345/329 |
| 4,760,388 A | * | 7/1988 | Tatsumi et al. | ................. | 345/1 |
| 4,954,979 A | * | 9/1990 | Eibner et al. | ............... | 707/542 |
| 5,038,301 A | * | 8/1991 | Thoma, III | .................... | 345/1 |
| 5,289,574 A | * | 2/1994 | Sawyer | ........................ | 395/332 |
| 5,361,078 A | * | 11/1994 | Caine | ............................ | 345/1 |
| 5,374,940 A | * | 12/1994 | Corio | ............................ | 345/1 |
| 5,590,771 A | * | 1/1997 | Cota | .......................... | 206/314 |
| 5,784,035 A | * | 7/1998 | Hagiwara et al. | ............... | 345/3 |
| 5,926,165 A | * | 7/1999 | Grewer et al. | ............... | 345/115 |
| 6,222,507 B1 | * | 4/2001 | Gouko | ........................... | 345/1 |

* cited by examiner

*Primary Examiner*—Lun-Yi Lao
(74) *Attorney, Agent, or Firm*—Albert O. Cota

(57) ABSTRACT

A system (10) which allows a primary computer monitor (12) to be electrically connected and structurally attached to a first secondary computer monitor (14) and a second secondary computer monitor (16). The electrical connections is made by a first cable assembly (30) or a second cable assembly (50) which includes digital R.F. filters (18). The cable assembly (30, 52) which connects the three monitors (12, 14, 16) to a set of video cards (22, 24, 26) located within a central processing unit (200) allows the monitors (12, 14, 16) to be operated independently or simultaneously. The monitors (12, 14, 16) are enclosed in a console structure (112) which includes a central opening (130) which houses the monitor (12), a first outer opening (132) which houses the monitor (14) and a second outer opening (134) which houses the monitor (16). Each of the outer openings include a retractable-pivoting slide assembly (100) which allows the first and second monitors (14, 16) to be retracted when not in use or extracted and pivoted into a viewing position when is use.

12 Claims, 5 Drawing Sheets

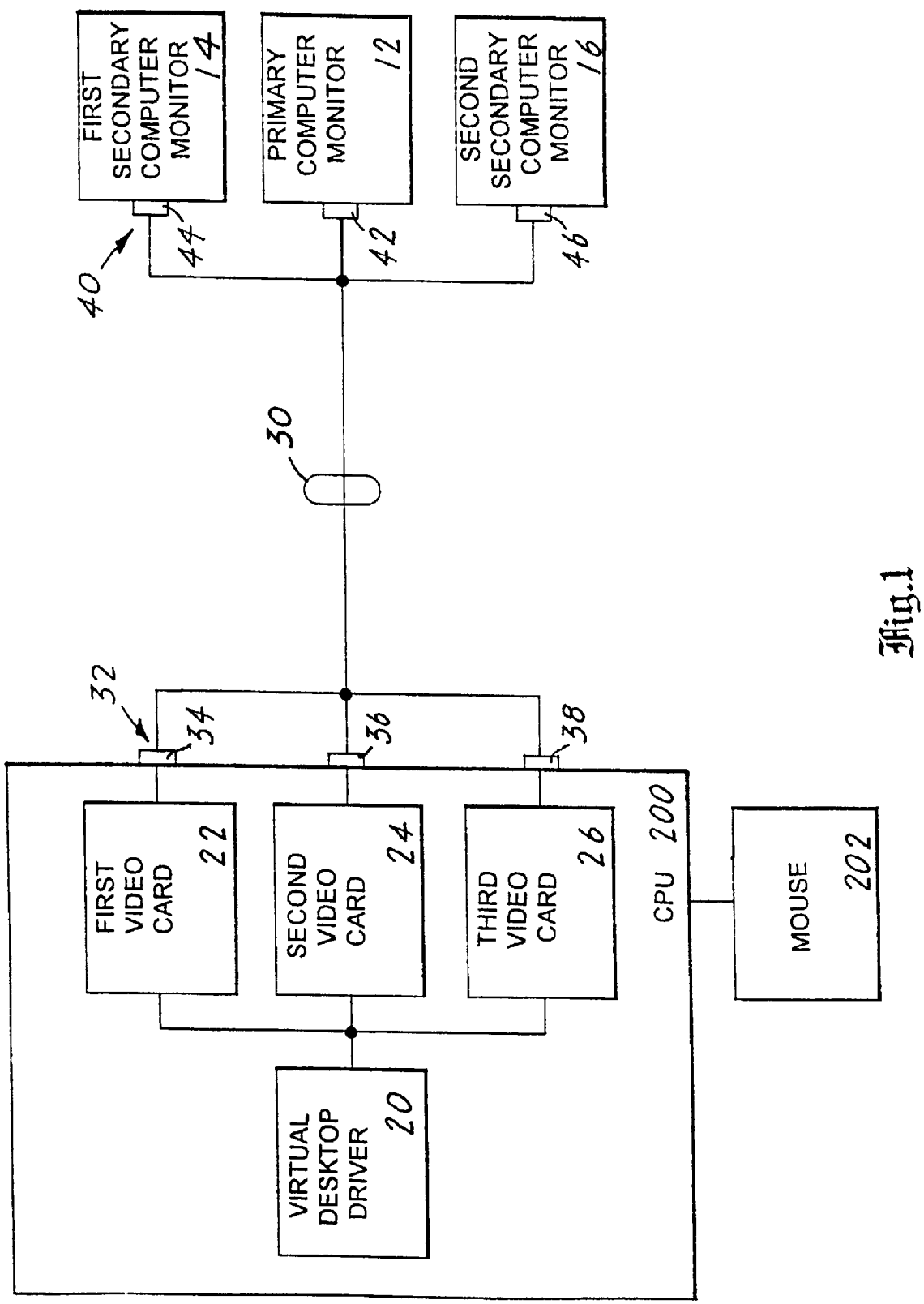

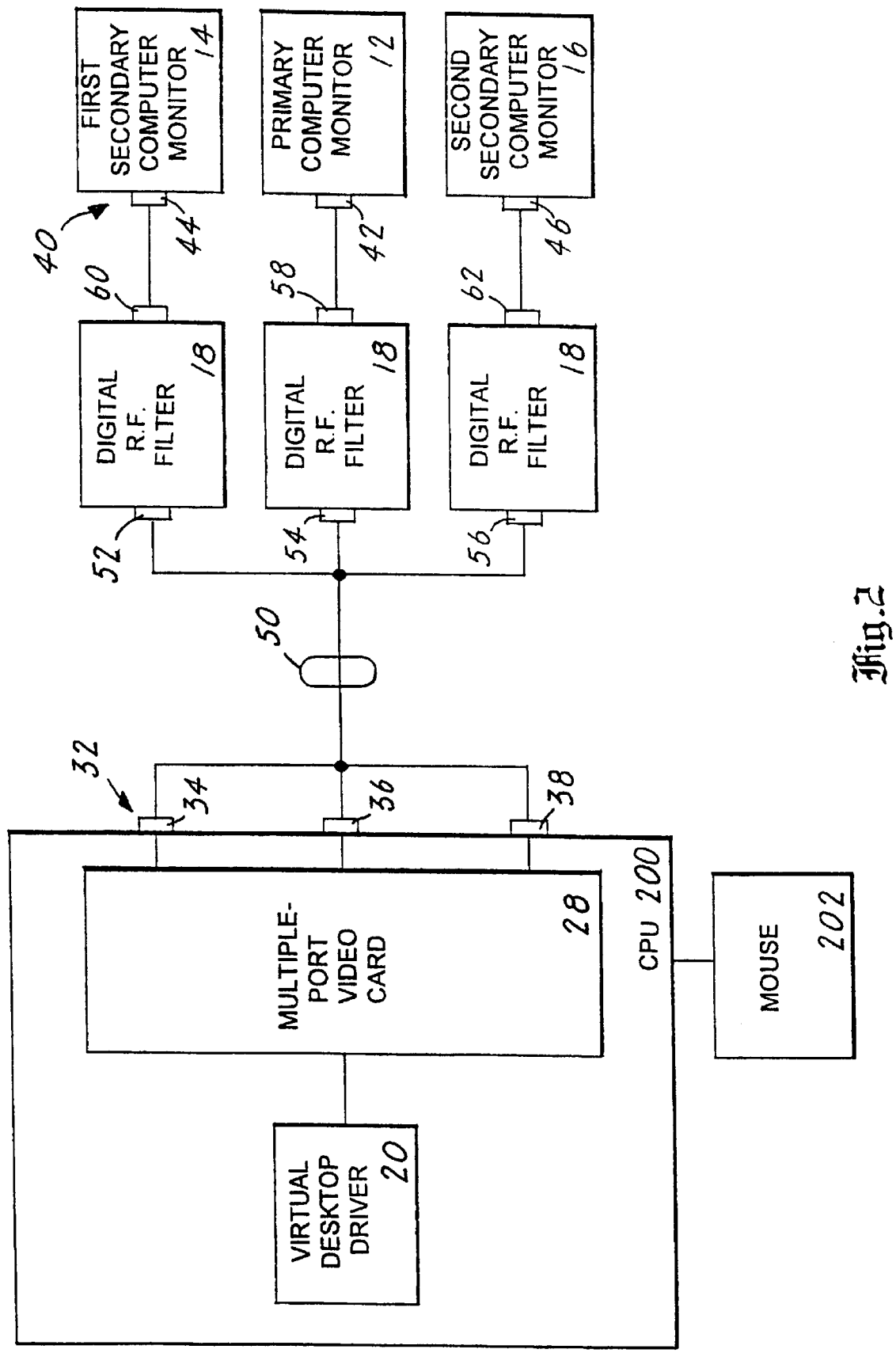

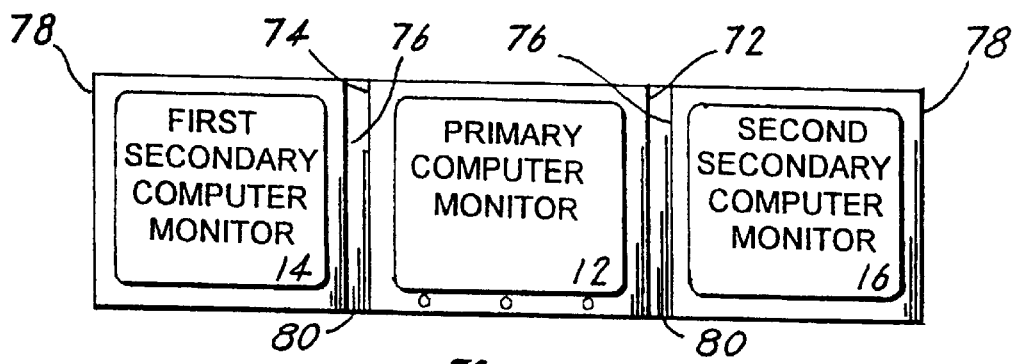
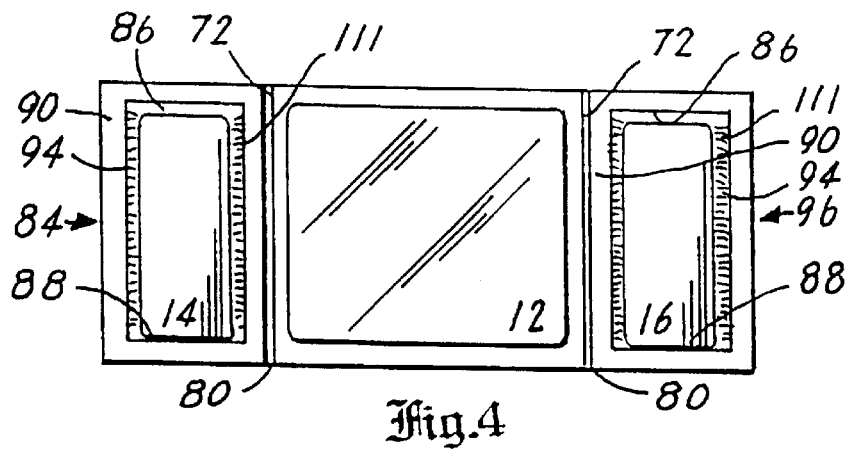
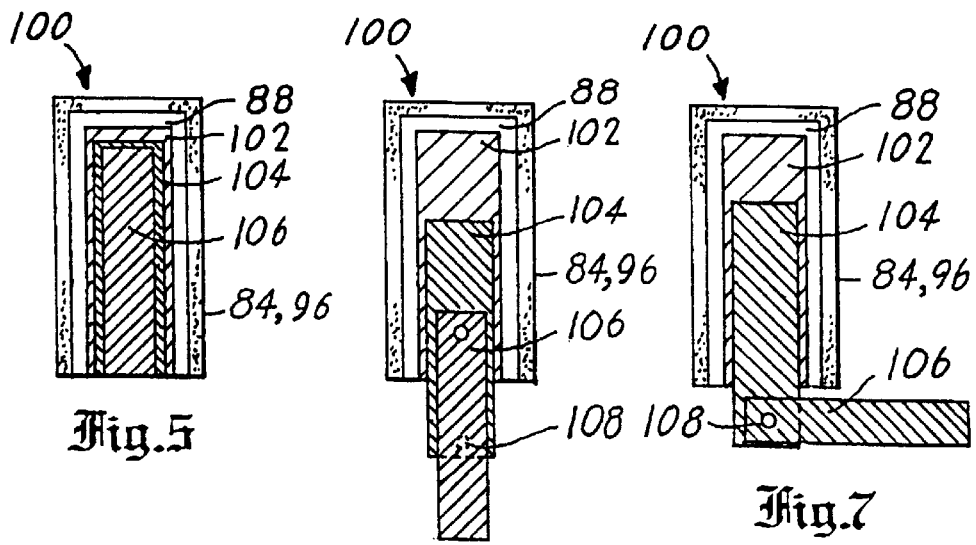

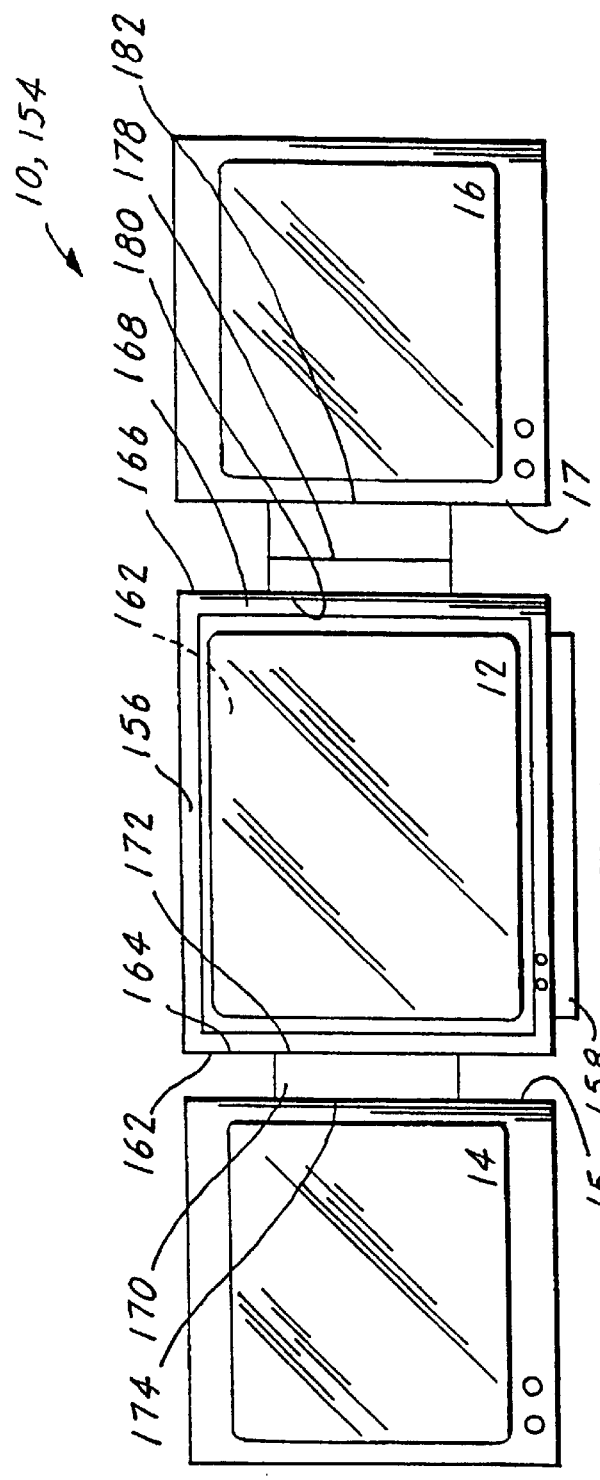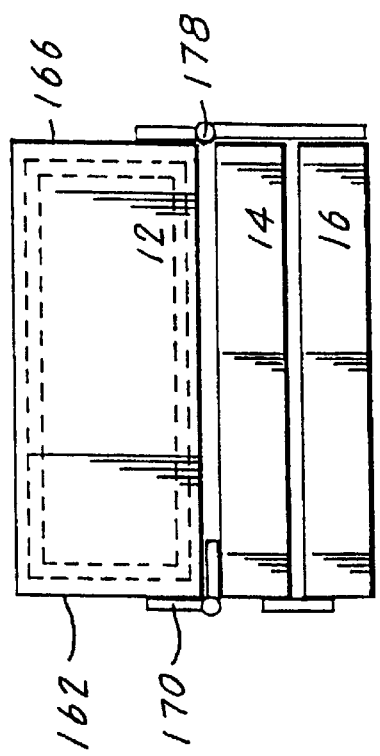
Fig.10
Fig.11

MULTIPLE ACCESS COMPUTER MONITORING SYSTEM

This Application claims benefit of provisional application Ser. No. 60/049,114 file Jun. 10, 1997.

TECHNICAL FIELD

The invention pertains to the general field of multiple computer monitors and more particularly to a multiple-access computer monitoring system which allows access to multiple displays simultaneously or independent of one another.

BACKGROUND ART

As computers have progressed to their widespread use of today, so have the number of and types of hardware and software available for use in computers. There are now programs available for almost every business application, as well as, many others devoted to such topics as gardening and musical instrument instruction. Also, the number of computer games available alone is staggering.

In order to keep up with many of the advancements, especially in software graphics and storage capacity, computers have become more and more powerful and faster. This increased power and speed is, of course, a welcome addition but, unfortunately there are still some problems that plague computer users.

One of the most common problems is that a person is generally only able to view one portion of a program at one time. Microsoft® attempted to remedy this situation with the introduction of its Windows®—based programs. The concept of windows was to allow a user to "open" different windows within a program. The screen would display a series of prompts and a user would use his/her keyboard or mouse to highlight a particular prompt, thereby opening that window. Whenever a different window was to be opened another prompt was highlighted and the new window was then superimposed over the existing window. Even though a user could manipulate the size and location of many of the windows, it still remained a problem of being able to maintain multiple open windows, that could all be accessed and used, on a single monitor.

There are many reasons why a user would want the ability to have various different applications of a single, or even multiple programs, at his/her disposal for immediate simultaneous viewing. A simple example would be for a person to call up a help menu while still viewing the part of the program that is presenting a problem. Another example is that with all of the available programs it would be very convenient to utilize a group of programs in which all are directed to the same subject, but with each possessing some unique qualities each their own. To be able to compare, analyze and utilize these programs simultaneously would greatly benefit anyone using them.

There have been efforts to solve this problem in the past, but, as results have shown, the only way to truly solve this problem is to provide a computer with separate, multiple, independent monitors, which, nevertheless are capable of also functioning as a single, modular unit.

A search of the prior art did not disclose any patents that read directly on the claims of the instant invention, however the following U.S. Patents are considered related:

| U.S. PAT. NO. | INVENTOR | ISSUED |
|---|---|---|
| 5,038,301 | Thoma | August 6, 1991 |
| 4,414,621 | Brown, et al | November 8, 1983 |
| 4,204,206 | McCarthy | May 20, 1980 |

The U.S. Pat. No. 5,038,301 patent discloses a method and apparatus for controlling two or more video display devices using a single display controller, wherein the display devices require different control data. The display control parameters are stored in a memory and, when the controller is to be switched from one display to another, the parameters are read from the memory into a substitution device. The substitution device receives modification control signals which depend on the newly selected display device and modifies the display control parameters before re-programming the display controller. The display controller then contains the parameters as appropriately modified for the currently controlled display device. The operator can switch from one monitor to another by generating an appropriate control signal.

The U.S. Pat. No. 4,414,621 patent discloses an interactive visual communications system consisting if a number of similar terminals linked together by narrow band communications links. Each terminal consists of visual display apparatus having a display and a display generator, an input interactive device for providing input instructions which are converted to graphic task instructions at the terminal, a processor for processing such graphic task instructions (GTI's) to control the display system and the input interactive device. The generated graphic task instructions are directed through an interaction handler which directs the GTI's to the processor as well as to a modem for transmission over the narrow band communications link to one or more similar terminals. The interaction handler receives GTI's from the other terminals which are also processed by the processor to control the display system.

The U.S. Pat. No. 4,204,206 patent discloses a system which includes a host computer having mass storage facilities together with a plurality of video display terminals having editing capabilities. Facilities are provided so that each editing terminal may communicate with the host computer which then downloads a control program into the terminal and is stored in the terminal's main memory. Data to be displayed at the terminal is downloaded from the host computer and, in addition, data may also be entered by a local keyboard for display and editing purposes. Each terminal is a processor driven terminal with a common bus architecture and performs various functions in accordance with the control program downloaded from the host computer. The terminal may display text obtained from one or more input sources on different areas of a common display screen. The teat in the different areas may be scrolled and edited independently of each other.

For background purposes and as indicative of the art to which the invention is related reference may be made to the remaining cited patents.

| PATENT NO. | INVENTOR | ISSUED |
|---|---|---|
| 5,590,771 | Cota | January 7, 1997 |
| 5,289,574 | Sawyer | February 22, 1994 |

-continued

| PATENT NO. | INVENTOR | ISSUED |
|---|---|---|
| 4,954,979 | Eibner, et al | September 4, 1990 |
| 4,760,388 | Tatsumi, et al | July 26, 1988 |
| 2,547,447 | DeBoer | April 3, 1951 |

DISCLOSURE OF THE INVENTION

The multiple-access computer monitoring system is designed to allow an operator access to multiple documents, templates, and reference materials simultaneously and independent of one another. The system is operated while working in the applications created for a Unix, Windows 95, Windows 98, Windows NT or MS/DOS environment.

In its most basic form and function, the system functions in combination with a central processing unit (CFU) that operates a primary computer monitor. A means is provided for electrically connecting and a means for structurally attaching to the primary computer monitor at least a first secondary computer monitor. The first secondary computer monitor is also operated by the CPU and can be selectively operated independently or simultaneously with the primary computer monitor. In a preferred embodiment, the system further includes a second secondary computer monitor that is also operated by the CPU. In the preferred embodiment, the primary computer monitor and the first and second secondary computer monitors can each be selectively operated independently or simultaneously.

The electrically connecting means is accomplished by a cable assembly which attaches on one end to the primary computer monitor, the first secondary computer monitor and the second secondary computer monitor. The other end of the cable assembly attaches to a set of video cards which are located within and operated by the CPU.

The system is designed to allow an operator access to multiple pages on separate monitors at the same time. This feature allows the operator to view, operate and work on three pages simultaneously and without interruption. For example, if the operator requires assistance form the HELP menu, the system allows for visual access to the menu without having to evacuate the primary computer monitor. Additionally, the operator is able to bring the HELP menu topics to either the first or second secondary computer monitors, without interference, by a simple manual or mouse code. Thus the operator is able to access the HELP menu information and continue to work on the present document which is visible on the primary computer monitor.

If the user needs to visually scan other pages from other files the system allows these other pages and/or files to be placed on either the first or second secondary monitors. Again, the operator is able to copy or edit any page desired, while keeping the original document intact and without having to exit or close the primary computer monitor to find the information desired.

The first and second secondary computer monitors can be easily adapted to an existing primary computer monitor. However, a console design is disclosed which integrates the primary computer monitor with the first and second secondary monitors. The console design features an extracting and retracting assembly that operates the first and/or the second secondary screens. The assembly can be designed to be operated manually or electrically.

In view of the above disclosure, it is the primary object of the invention to design and produce a multiple-access computer monitoring system which allows the simultaneous or independent viewing of data on either a primary computer monitor, a first secondary computer monitor or a second secondary computer monitor.

In addition to the primary object of the invention it is also an object of the invention to design and product a multiple-access computer monitoring system that:

can be easily used by anyone versed in computer usage, allows a primary operator and three other operators to see each other while video conferencing from four different locations, can be used with a variety of software operating systems, can be used with various types and technologies of computer monitors, allows up to three full size pages of documents and/or drawings to be reviewed simultaneously, can increase productivity.

allows past, present and future financial data to be reviewed simultaneously, allows up to three searches to be conducted on one screen without losing the data on the other two screens, is reliable and relatively maintenance free, and is cost effective from both a consumer's and manufacturer's point of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a block diagram of a first cable assembly that is used to connect a primary computer monitor and a first and second secondary computer monitor respectively to a first, second and third video card located within a CPU.

FIG. 2 is a block diagram of a second cable assembly that incorporates three digital R.F. filters which are connected in series between the three monitors and a single, multiple-port video card located within the CPU.

FIG. 3 is an elevational front view of a first design configuration for a structure subsystem which attaches the first and second secondary computer monitors to the sides of a primary computer monitor.

FIG. 4 is an elevational front view of a second design configuration for a structure subsystem which utilizes a first and a second side casing that are attached to the sides of a primary computer monitor and which are dimensioned to respectively enclose the first and second secondary computer monitors.

FIG. 5 is a top plan view of a retractable-pivoting slide assembly shown in a fully retracted position within a side casing.

FIG. 6 is a top plan view of the retractable-pivoting slide assembly shown in a partially extracted position.

FIG. 7 is a top plan view of the retractable-pivoting slide assembly shown in a fully extracted position with a sliding-pivoting section, to which is attached a secondary computer monitor, in a pivoted, computer monitoring viewing position.

FIG. 10 is an elevational front view of a fourth design configuration for a structure subsystem which includes a first hinge assembly to which is attached the first secondary computer monitor and a second hinge assembly to which is attached the second secondary computer monitor. The two secondary monitors are shown in their pivoted, in-use position.

FIG. 11 is a top plan view of the structure of FIG. 10 showing the first secondary computer monitor folded over and interfacing with the primary computer monitor and the second secondary computer monitor overlapping the first secondary computer monitor.

BEST MODE FOR CARRYING OUT THE INVENTION

Figure 8:
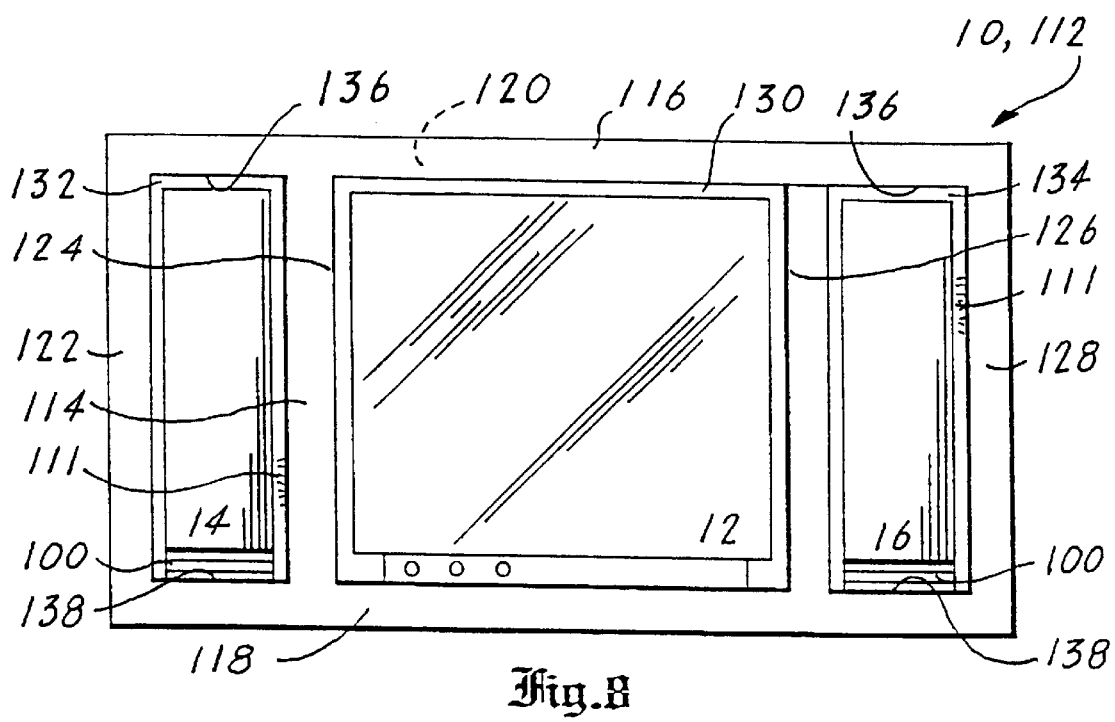
FIG. 8 is an elevational front view of a third design configuration for a structure subsystem which consists of a console that includes a central opening for enclosing the primary computer monitor and a first and second outer opening for enclosing respectively the first and second secondary computer monitors.

The best mode for carrying out the multiple-access computer monitoring system 10 is presented in terms of an electrical/electronic subsystem 11 which is disclosed in two design configurations, and a structural subsystem 70 which is disclosed in four design configurations.

The electrical/electronic subsystem as shown in FIGS. 1–2 is comprised of the following major elements; a primary computer monitor 12, a first secondary computer monitor 14, a second secondary monitor computer 16, digital R.F. filters 18, a virtual desktop software driver 20, a first cable assembly 30, a second cable assembly 50, a first video card 22, a second video card 24, a third video card 26 and a single multiple-port video card 28. The above elements operate in combination with a central processing unit (CPU) 200 and a mouse 202.

The first design configuration of the electrical/electronic system 11, as shown in FIG. 1, consists of the primary computer monitor 12, which is electrically connected to a first secondary computer monitor 14 and the second secondary computer monitor 16. The primary monitor is typically comprised of cathode ray tube (CRT) and the first and second secondary modular can consist of a liquid crystal diode (LCD) screen, an active-matrix screen, a thin CRT screen or any other technology that can produce a relatively thin screen. If the multiple-access computer monitor system 10 is used on notebook or laptop computer all the monitors can consist of LCD screens or active-matrix screens.

All three monitors 12,14,16 are connected to the central processing unit (CPU) 200. The CPU 200 allows the primary, monitor 12 and the first and second secondary computer monitors 14,16 to be operated independently or simultaneously by the virtual desktop software driver 20 in combination with the muse 202 or a keyboard. The driver 240 functions as a buffer by receiving input control signals from the GPU 200 and applying to the video card 22,24,26 control signals and refresh rate control signals. The mouse 202 provides the means by which the computer monitors can be selectively operated. The mouse 202 is manipulated by clicking, holding and dragging the software, data files, documents and icons to the selected monitor 12,14, or 16. The electrical connections of the three monitors 12,14,16 to the CPU 200 is made by using the first or second cable assemblies 30 or 50.

The first cable assembly 30, as shown in FIG. 1, has a first end 32 and a second end 40. The first end 32 consists of first male input connector 34, a second male input connector 36 and a third male input connector 38. Each input connector is comprised of a fifteen-pin D-sub connector. The three connectors 34,36 and 38 are respectively connected to a first video card 22, a second video card 24 and a third video card 26. Each of the cards is comprised of a VGA video card, such as are available from Matrox Graphics Inc. located in Dorval, Quebec, Canada.

Each video card, as also shown in FIG. 1, is inserted into and operated by the CPU 200 and the virtual desktop driver 20. Alternatively, as shown in FIG. 2, in lieu of the three separate video cards 22,24,26 a single Multiple Port Video Card such as a MVP3D video card available from STB Systems Inc. located in Richardson, Tex.

In the first cable assembly 30, the second end 40 has a first male output connector 42, a second male output connector 44 and a third male output connector 46. These connectors, which are identical to the three input connectors 34,36,38, are directly connected respectively to the primary computer 12, the first secondary computer monitor 14 and the second secondary computer monitor 16 as shown in FIG. 1.

The second design configuration of the electrical/electronic subsystem 11, as shown in FIG. 2, differs in that the second cable assembly 50 is used in lieu of the first cable assembly 30. The front end 32 of the second cable assembly 50 is identical in form and function to the first end 32 of the first cable assembly 30. However, in the second cable assembly 50, between the first end 32 and the second end 40 are located in series within each line a digital R.F. filter 18 which eliminates or at least minimizes any background noise that may be present.

Two methods are disclosed for connecting the filters 18 between the respective video cards and the monitors. In the first method, the cable assembly 50 includes, intermediate of the first end 32 and the second end 40, three input connectors: a first input connector 52, a second input connector 54 and a third input connector 56 which are attached to the respective digital R.F. filter 18. The three filters, in turn, have three output connectors: a first output connector 58, a second output connector 60 and a third output connector 62. These three output connectors are connected to the first, second and third output connector 42,44,46, which attaches to the primary computer monitor 12, the first secondary computer monitor 14, and the second secondary computer monitor 16.

In the second digital R.F. filter connecting method (not shown), the three filters are hard-wired in series into the cable assembly 50. The particular attachment method depends on the design configuration of the particular digital R.F. filter utilized.

The structure subsystem 70 is disclosed in four design configuration as shown in FIGS. 3–11.

In the first design configuration, which utilizes the most basic structure, as shown in FIG. 3, the primary computer monitor 12 includes a first side 72 and a second side 74. Likewise, the first and second secondary computer monitors 14,16 each have an inner side 76 and an outer side 78. To the first side 72 of the primary computer monitor 12 is attached, by an attachment means 80, the inner side 76 of the first secondary computer monitor 14, and to the second side 74 of the monitor 12 is attached, by the attachment means 80, the inner side 76 of the second secondary computer monitor 14. The attachment means 80 can consist of an adhesive, a combination female and male dove-tail structure or a commercial grade hook and loop fastener.

The second design configuration, as shown in FIGS. 4–7, utilizes a first side casing 84 and a second side casing 96.

Each of the casings includes an upper-inner surface 86, a lower-inner surface 88, a front edge 90 and a rear edge 92. From the front edge 90 of each casing 84,96 extends inward an opening 94 that is dimensioned to enclose the respective first and second secondary computer monitors 14,16.

The first side casing 84 is attached, by an attachment means 80, to the first side 72 of the primary computer monitor 12 and likewise, the second side casing 96 is attached by the attachment means 80 to the second side 74 of the primary computer monitor 12.

Each of the side casings 84,96 includes a means for allowing the first and second secondary computer monitors 14,16 to be retracted into their respective first and second side casings 84,96 when the monitors are not in use, and to be extracted outward and pivoted into a viewing position when the monitors are in use one method of accomplishing the retraction and extraction of the secondary computer monitors is by utilizing an integrated retractable-pivoting slide assembly 100, as shown in FIGS. 5, 6 and 7. The assembly 100 is comprised of a stationary lower section 102 that is attached to the lower-inner surface 88 of the casing 84,96, an intermediate sliding section 104 that captively traverses along the stationary lower section 102, and a sliding-pivoting section 106 to which is attached one of the secondary computer monitors 14,16. The section 106, which is designed to traverse along the intermediate sliding section 104, includes a combination stop-pivoting means 108 which stops the travel of the intermediate sliding section 106 and allows the section 106 to pivot outward substantially in alignment with the plane of the primary computer monitor 12. FIG. 5 shows the assembly 100 fully extracted and pivoted outward into a selectable viewing position.

The above described assembly 100 is one of many designs which can be utilized to retract and extract the secondary computer monitors 14,16 into a viewing position. For example, a tongue and groove structure with a pinned rotating stop that allows the tongue and groove structure to be pivoted can also be utilized.

The above described retractable-pivoting slide assemblies 100 can be designed to be operated manually or an electric d-c motor can be mechanically coupled to the assembly 100. The motor is activated by a polarity-reversing switch wherein in a first position the assembly 100 is extracted and in a second position the assembly 100 is retracted.

To further enhance the utility of the first and second side casings 84,86 they may include a multiplicity. of side bristles. 111. The bristles 111 remove dust and particles from the first and second secondary monitors when they are retracted or extracted from the first and second side casings 84,96.

Figure 9:
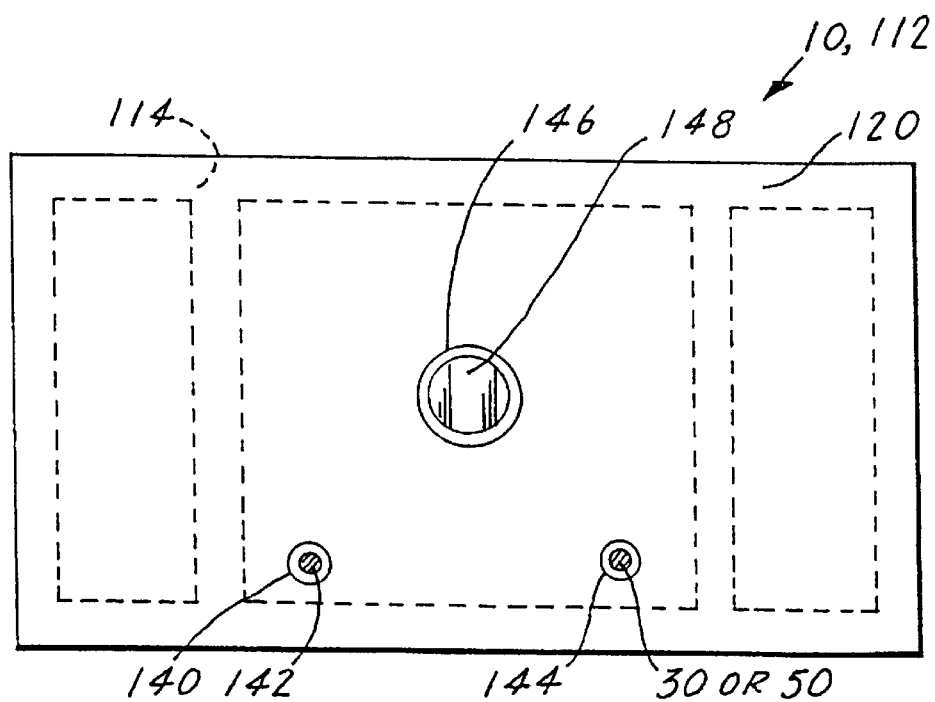
FIG. 9 is an elevational rear view of the console of FIG. 8 showing a first opening which receives an a-c power cord, a second opening which receives either the first or second cable assemblies and a third opening to which is attached an exhaust fan assembly.

The third design configuration for structurally housing and attaching the first and second secondary computer monitors 14,16 to the primary computer monitor 12 comprises a console structure 112, as shown in FIGS. 8 and 9.

The console structure 112 includes a front section 114, an upper section 116, a lower section 118, a rear section 120, a first wide section 122, a first inner-side section 124, a second inner-side section 126 and a second side section 128. As shown in FIG. 8, between the first and second inner-side sections 124,126 extends a central opening 130. Likewise, between the first side section 122 and the first inner-side section 124 extends a first outer opening 132, and between the second side section 128 and the second inner-side section 126 extends a second outer opening 134. Each of the outer openings 132,134 include an upper-inner surface 136 and a lower-inner surface 138. The central opening 130 is dimensioned to enclose the primary computer monitor 12 and the first and second outer openings 132,134 are dimensioned to respectively enclose the first secondary computer monitor 14 and the second secondary computer monitor 16.

The third design configuration utilizes the integrated retractable-pivoting slide assembly 100 as shown in FIGS. 5–7 and as described supra in the second design configuration.

On the rear section 120 of the console 112, as shown in FIG. 9, is located a first opening 140 which is dimensioned to receive an a-c power cord 142, a second opening 144 dimensioned to receive the first or second cable assemblies 30,50 and a third opening 146 which is dimensioned to allow an exhaust fan assembly 148 to be attached. As in the second design configuration, the first and second outer openings 132,134 may also include a multiplicity of side bristles 111 which aid in removing dust and particles from the surface of the monitors.

The fourth and final design configuration for structurally housing and attaching the first and second secondary computer monitors 14,16 to the primary computer monitor 12 comprises a console structure 154, as shown in FIGS. 10 and 11.

The console structure 154 includes an upper section 156, a lower section 158, a rear section 160, a first side section 16. having a front edge 164, and a second side section 166 having a front edge 168. The console structure 154 is dimensioned to enclose the primary computer monitor 12.

The console structure 154 operates in combination with a first hinge assembly 170 and a second hinge assembly 178. The hinge assemblies 170,178 can consist of a single hinge as shown in FIG. 10 or two separate hinges (not shown) may be employed.

The first hinge assembly 170 has a first side 172 that is attached to the first side section 162, and a second side 174 that is attached to an inner side 15 of the first secondary computer monitor 14. The two secondary computer monitors are shown in their pivoted in-use positions in FIG. 10. When the first secondary computer monitor 14 is in a non-use position it is folded over to interface with the front surface of the primary computer monitor 12, as shown in FIG. 11.

The second hinge assembly 178 also has a first side 180 that is attached to the second side section 166, and a second side 182 that is attached to an inner side 17 of the second secondary computer monitor 16. The second hinge assembly 178 is longer and is centrally offset to overlap the first secondary computer monitor 16 when the second secondary computer monitor is folded-over into its non-use position, as also shown in FIG. 11. To augment the utility of the fourth design configuration, a locking device 184 may be included which is positioned, as shown in FIG. 11, to secure the two secondary computer monitors 14,16 in their folded-over, non-use position.

OPERATING SEQUENCE

To operate the multiple-access computer monitoring system, the following steps are performed:

1. Open a first program which is viewable on the primary computer monitor 12,
2. open a second program in a restore position,
3. use a mouse to click, hold and drag the second program to the first secondary computer monitor 14,
4. open a third program in a restore position, and
5. use a mouse to click, hold and drag the second program to the second secondary computer monitor 16.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

What is claimed is:

1. A multiple-access computer monitoring system which functions in combination with a central processing unit (CPU) that operates a primary computer monitor, said system comprising a means for electrically and structurally attaching to said primary computer monitor at least a first secondary computer monitor and a second secondary computer that are operated by said CPU, wherein said primary computer monitor, said first secondary computer monitor and said second secondary computer can be selectively operated independently or simultaneously, wherein said means for electrically connecting said primary computer monitor and said first and second secondary computer monitors comprises a first cable assembly having a first end and a second end, wherein the first end consists of a first male connector, a second male connector and a third male connector that are respectively connected to a first video card, a second video card and a third video card, wherein said video cards are inserted into and operated by said CPU and a virtual desktop driver wherein the second end also consists of a first male connector, a second male connector and a third male connector that are respectively connected to said primary computer monitor, said first secondary computer monitor and said second secondary computer monitor.

2. The system as specified in claim 1 wherein said male connectors are each comprised of fifteen-pin D-sub male connectors.

3. The system as specified in claim 1 wherein said means for electrically connecting said primary computer monitor and said first and second secondary computer monitors comprises a second cable assembly having a first end and a second end, wherein the first end consists of a first male connector, a second male connector and a third male connector that are respectively connected to a first video card, a second video card and a third video card, wherein said video cards are inserted into and operated by said CPU and a virtual desktop driver wherein the second end also consists of a first male connector, a second male connector and a third male connector that are respectively connected to said primary computer monitor, said first secondary computer monitor and said second secondary computer monitor wherein between the first end and the second end are located in series within each line a digital R.F. filter.

4. The system a specified in claim 3 wherein said male connectors are each comprised of fifteen-pin D-sub male connector;.

5. The system as specified in claim 1 wherein said video cards are each comprised of a VGA video card.

6. The system as specified in claim 5 wherein said VGA video cards are further comprised of a Matrox Graphics Inc. card.

7. The system as specified in claim 5 wherein said VGA video cards are further comprised of a single STB system Inc. MVP3D multiple port video card which supports all three said computer monitors.

8. A multiple-access computer monitoring system which functions in combination with a central processing unit (CPU) that operates a primary computer monitor, said system comprising a means for electrically and structurally attaching to said primary computer monitor at least a first secondary computer monitor and a second secondary computer that are operated by said CPU, wherein said primary computer monitor, said first secondary computer monitor and said second secondary computer can be selectively operated independently or simultaneously, wherein said means for structurally attaching said first and second secondary computer monitors to said primary computer monitor comprises:

a) a console structure comprising an upper section, a lower section, a rear section, a first side section, a first inner-side section, a second inner-side section, and a second side section, wherein between the first and second inner-side sections extends a central opening, between the first side section and the first inner-side section extends a first outer opening and between the second side section and the second inner-side section extends a second outer opening, wherein each said outer opening includes an upper-inner surface and a lower-inner surface, wherein the central opening is dimensioned to enclose said primary computer monitor and said first and second outer openings are dimensioned to respectively enclose said first and second secondary computer monitors, b) an integrated retractable-pivoting slide assembly comprising a stationary section and a sliding-pivoting sections, wherein the stationary section is longitudinally attached to the lower-inner surface of each said outer opening and a sliding-pivoting section is longitudinally attached to the lower surface of said first and second secondary computer monitors, wherein when said first and second secondary computer monitors are fully extracted from their respective outer openings, said slide assembly allows the extracted said monitors to be pivoted outward into a selectable viewing position, and c) a set of openings located on the rear section of said console structure, wherein a first opening is dimensioned to receive an a-c power cord and a second opening dimensioned to receive either the first cable assembly or the second cable assembly.

9. The system a specified in claim 8 further comprising an exhaust fan assembly attached to a third opening located on the rear section of said console structure.

10. The system as specified in claim 8 wherein said first and second outer openings each include side bristles that remote dust and particles from said first and second secondary computer monitors when said monitors are retracted into or extracted from said first and second outer openings.

11. A multiple-access computer monitoring system which functions in combination with a central processing unit (CPU) that operates a primary computer monitor, said system comprising a means for electrically and structurally attaching to said primary computer monitor at least a first secondary computer monitor and a second secondary computer that are operated by said CPU, wherein said primary computer monitor, said first secondary computer monitor and said second secondary computer can be selectively operated independently or simultaneously, wherein said means for structurally attaching said first and second secondary computer monitors to said primary computer monitor comprises:

a) a console structure comprising an upper section, a lower section, a rear section, a first side section having a front edge, and a second side section having a front edge, wherein said console structure is dimensioned to enclose said primary computer monitor, b) a first hinge assembly having a first side that is attached to the first side section and a second side that is attached to an inner side of said first secondary computer monitor, wherein when said first secondary computer monitor is in a non-use position it is folded over to interface with said primary computer monitor, and c) a second hinge assembly having a first side that is attached to the second side section and a second side that is attached to an inner side of said second secondary computer monitor, wherein said second hinge assembly is longer and is centrally offset to overlap said first secondary computer monitor when said second secondary computer monitor is folded-over into its non-use position.

12. The system as specified in claim 11 further comprising a locking device positioned to secure said first and second secondary computer monitors in their folded-over, non-use position.

* * * * *